J. JACOBS.
Illuminating Tile for Roofs and Pavements.

No. 222,053. Patented Nov. 25, 1879.

WITNESSES:
John Adams
Charles Reilly

INVENTOR:
Jacob Jacobs

UNITED STATES PATENT OFFICE.

JACOB JACOBS, OF NEW YORK, N. Y.

IMPROVEMENT IN ILLUMINATING-TILES FOR ROOFS AND PAVEMENTS.

Specification forming part of Letters Patent No. 222,053, dated November 25, 1879; application filed October 6, 1879.

*To all whom it may concern:*

Be it known that I, JACOB JACOBS, of New York city, in the county of New York and State of New York, have invented certain new and useful Improvements in Illuminating-Tiles for Roofs and Pavements, of which the following is a specification, reference being had to the accompanying drawings, in which—

Figure 1:
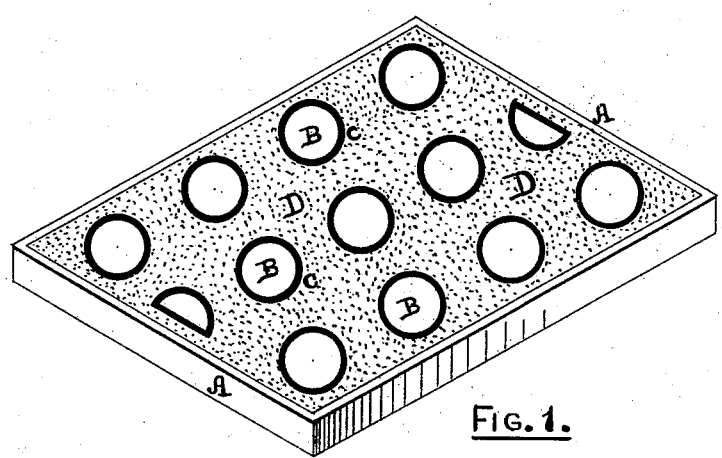
Figure 2:
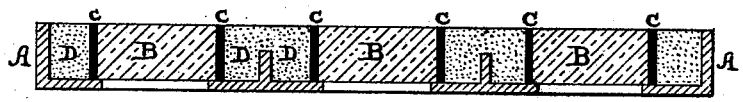

Figure 1 is a perspective view of the upper side of my tile, and Fig. 2 is a cross-section of said tile.

A represents the iron tile; B B, the glass lenses; C C, the lead rings or jackets surrounding the lenses, and D the cement filling.

Similar letters of reference indicate like parts.

The object of my invention is to so construct an illuminating-tile that the glass lenses will be protected from breakage due to expansion by placing an intervening substance between the glass and the filling (cement) which forms the walking-surface; and it consists, further, in giving a firmer foothold to persons when walking upon the tile.

It has been found that in tiles where cement comes directly in contact with the glass lenses the glasses split and chip in an almost mysterious manner, and thickening the lenses and careful annealing of the glasses seem not to overcome the trouble. The most reasonable explanation of the splitting is that the cement holds a certain amount of moisture, and is therefore cold and damp, while the glasses—sometimes from the rays of the sun, and other times from the heat in the building underneath the tiles—are dry and warm. In consequence of the natural laws of expansion and contraction, the glasses break. How curiously cold and heat act on these lenses may be illustrated by taking one of these lenses, wetting the tip of the finger with spittle from the mouth, drawing the finger across the upper surface of the lens, and holding a hot iron close to the line of wet, and the lens falls apart in two pieces, as though cut with a knife.

I construct the tile of metal, of proper strength and of suitable shape, with openings in the same to permit light to pass through.

The lenses before they are set in place in the tile I surround with a tight-fitting jacket to each of lead or soft metal. The object of this jacket or ring is to separate the glass from the cement filling which forms the walking-surface of the tile, and thus protects the glass from breaking. The metallic rings also give a better foothold.

After the glass lenses, with their lead jackets, are placed in position in the iron tiles the remaining spaces in the tiles are filled with Portland cement, mixed in the usual way, and applied in a plastic state and allowed to harden before the tile is used.

The upper surface of the lenses, the jackets, and the cement have one plane, so that the feet of a person standing upon the tile shall be supported equally by each material named, while the sustaining strength lies in the iron tile in which the whole rests.

The cold cement, almost invariably damp, will thus be separated from the warm glass, and thus the latter be protected from the usual tendency to crack. The yielding lead jackets will permit the expansion or contraction of any or all of the different materials without damage to any of them. This construction will also make the tile more thoroughly waterproof, as no crumbling of the cement can take place around the lenses, even though the lenses be made of equal or greater strength than the cement.

The invention of a combination of glass lenses set in small apertures in strong iron plates or gratings, forming a surface suitable for being walked upon, is primarily due to Thaddeus Hyatt, as the recorded patents for illuminating-tiles duly prove; and so, too, in forming the approaches to a building from the sidewalk over an area way by means of a solid translucent bridging of iron and glass which serves the double purpose of stoop and roof, the merit of such invention not only remains with the said Thaddeus Hyatt, but he and his brother, the late Theodore Hyatt, have duly placed on record both in the United States and in Great Britain further improvements in applying cement to the surfaces of the illuminating iron-tiles as a preventative against slipping.

Now, in setting glass lenses in an iron-plate, elastic materials, like india-rubber, have been used; also joints have been made with putty, or its equivalent, as the lower or horizontal half, and a fusible cement as the upper or vertical half. Further than this: in the construction of Hyatt's original tiles lead was employed to make a water-tight joint between the glass and iron. The lead was put around the glass and then the lead was calked in between the glass and the iron with a half-round set to make a tight joint.

In my invention, as illustrated in the accompanying drawings and described in this specification, the iron-grating, as usual, forms the general strength. Before being set in the apertures, I cast a band of lead around each of the glass lenses. I then set the glass lenses, with their lead jackets on, in their proper position, and apply the plastic cement, and give the latter sufficient time to harden.

In my tile it is obvious that no calking of the lead could be done; the cement would all break away if attempted. Neither could the plastic cement be first applied, and (after hardening) the glass lenses be set in with a lead band, or the lead calked in, or melted lead poured in.

In the case of an iron tile where the cement filling surrounds the glasses, the water-tight qualities are perfect—there is no call for the interposition of lead, putty, or anything else between the Portland cement and the glass, so far as making a water-tight joint is concerned; but as my original invention I interpose a band of lead encircling the glasses between the latter and the Portland-cement filling to accomplish an entirely different purpose—not for its water-tight qualities, but to protect the glass from breakage due to certain natural laws, as previously explained in this specification.

Having thus fully set forth the nature and merits of my invention, what I claim as new is—

An illuminating-tile in which the glass lenses B B are provided with an encircling jacket, C C, of lead or other yielding material, in combination with a filling, D, of Portland cement, or other adhesive material, applied in a plastic state, and set in an iron plate or grating having suitable apertures in the same, substantially in the manner and for the purpose set forth.

JACOB JACOBS.

Witnesses:
 JOHN ADAMS,
 CHARLES REILLY.